United States Patent [19]

Spelthann et al.

[11] Patent Number: 5,798,413

[45] Date of Patent: *Aug. 25, 1998

[54] FLEXIBLE POLAR THERMOPLASTIC POLYOLEFIN COMPOSITIONS

[75] Inventors: Heinz H. Spelthann, Trier, Germany; Karlheinz Hausmann, Neuchatel, Switzerland

[73] Assignee: E. I. du Pont de Nemours and Company, Wilmington, Del.

[ * ] Notice: The term of this patent shall not extend beyond the expiration date of Pat. No. 5,434,217.

[21] Appl. No.: 702,622

[22] PCT Filed: Mar. 1, 1995

[86] PCT No.: PCT/US95/02573

§ 371 Date: Aug. 29, 1996

§ 102(e) Date: Aug. 29, 1996

[87] PCT Pub. No.: WO95/24444

PCT Pub. Date: Sep. 14, 1995

Related U.S. Application Data

[63] Continuation-in-part of Ser. No. 205,439, Mar. 4, 1994, Pat. No. 5,434,217.

[51] Int. Cl.$^6$ ............................................. C08G 67/02
[52] U.S. Cl. ........................ 525/66; 525/63; 525/64; 525/69; 525/221; 525/207; 525/208
[58] Field of Search ............................ 525/63, 64, 66, 525/69, 221

[56] References Cited

U.S. PATENT DOCUMENTS

| | | | |
|---|---|---|---|
| 4,070,532 | 1/1978 | Hammer | 525/11.2 |
| 4,157,428 | 6/1979 | Hammer | 525/134 |
| 4,868,242 | 9/1989 | George et al. | 525/64 |
| 4,927,888 | 5/1990 | Strait et al. | 525/285 |
| 5,089,556 | 2/1992 | Tabor et al. | 525/64 |
| 5,395,881 | 3/1995 | Spelthann | 525/63 |
| 5,409,991 | 4/1995 | Mitsuno et al. | 525/66 |
| 5,424,362 | 6/1995 | Hwang et al. | 525/71 |
| 5,434,217 | 7/1995 | Spelthann | 525/63 |
| 5,610,234 | 3/1997 | Spelthann | 525/64 |

FOREIGN PATENT DOCUMENTS

| | | | |
|---|---|---|---|
| A 0 413 912 | 2/1991 | European Pat. Off. | C08L 23/08 |
| 36 33 056 A1 | 4/1988 | Germany | C09D 3/733 |
| WO 88/03543 | 11/1987 | WIPO | C08L 23/00 |
| WO 93/02139 | 7/1992 | WIPO | C08L 29/04 |
| WO A 94 04610 | 3/1994 | WIPO | C08L 23/02 |

OTHER PUBLICATIONS

PCT International Search Report for International Application No. PCT/US95/02573 (AD–6178–A) dated Dec. 14, 1995.

PCT International Search Report for International Application No. PCT/US93/07369 (AD–6071) dated Jan 13, 1994.

*Primary Examiner*—Mark Nagumo
*Attorney, Agent, or Firm*—Craig H. Evans

[57] ABSTRACT

Polar thermoplastic polyolefin blends are provided which are flexible and are particularly useful in replacing polyvinyl chloride sheeting used as liners, folders, etc. The blends comprise in general, a non-polar thermoplastic polyolefin, a functionalized polar ethylene copolymer, and a functionalized olefin polymer as a compatibilizer, all of which are chlorine-free.

12 Claims, No Drawings

FLEXIBLE POLAR THERMOPLASTIC POLYOLEFIN COMPOSITIONS

CROSS-REFERENCE TO RELATED APPLICATION

This is a continuation-in-part of U.S. Pat. No. 5,434,217, issued Jul. 18, 1995 (application Ser. No. 08/205,439, filed Mar. 4, 1994).

BACKGROUND OF THE INVENTION

1. Field of Invention

This invention relates to polyolefin compositions and more particularly to such compositions which are flexible and polar, and to shaped articles made from them.

2. Background Discussion

Polyvinyl chloride (PVC) sheets have been on the market for many years and have been the standard liner material in the housing industry. PVC sheets are characterized by being flexible over a variable temperature range, heat-sealable, and oil-resistant. However, with the trend toward a chlorine-free environment, there is a need for a PVC sheeting alternative. Ethylene/propylene/diene monomer (EPDM) rubbers are alternatives, but these are difficult to seal. Thus, there is a need for PVC-free sheets which are thermoplastic and heat-sealable, halogen-free and flexible.

SUMMARY OF THE INVENTION

According to the present invention there is provided a flexible, nonhalogen-containing polymer composition which comprises a blend of:

(1) 50–98% by weight of a non-polar thermoplastic polyolefin, (2) 1–25% by weight of a compatibilizing polymer which is an olefin polymer containing less than 20% by weight of a copolymerized polar monomer, and containing 0.01–10% by weight of functional groups selected from the group consisting of an epoxy, a carboxylic acid or a derivative thereof, an amino and a hydroxyl; and (3) 1–49% by weight of a polar ethylene copolymer consisting essentially of:
 (a) 30–90% by weight of ethylene;
 (b) 0–60% by weight of at least one copolymerizable, ethylenically unsaturated organic compound; and
 (c) 0–30% by weight of carbon monoxide; wherein the total of (a), (b) and (c) is 100%;

said polar ethylene copolymer (3) containing 0.01–20% by weight of functional groups selected from the group consisting of an epoxy, a carboxylic acid or a derivative thereof, an amino and a hydroxyl; whereby if an epoxy group is used to functionalize the compatibilizing polymer (2), then the polar ethylene copolymer (3) is functionalized with a carboxylic acid or a derivative thereof or with an amino or hydroxyl group;

if a carboxylic acid or a derivative thereof is used to functionalize the compatibilizing polymer (2), then the polar ethylene copolymer (3) is functionalized with an epoxy, an amino or a hydroxyl group; and if an amino or hydroxyl group is used to functionalize the compatibilizing polymer (2), then the polar ethylene copolymer (3) is functionalized with an epoxy group or with a carboxylic acid or a derivative thereof.

Also provided is a shaped article such as a sheet or film made from the aforesaid composition.

DETAILED DESCRIPTION OF THE INVENTION

The invention relates to flexible, nonhalogen-containing thermoplastic polymer blends which are useful in sheet form as liners for roofing, etc. or for making folders, and in film form as packaging films. These blends generally are formed by combining a non-polar thermoplastic polyolefin and a soft, polar thermoplastic ethylene copolymer. Reactive compatibilizing polymers are used in order to affect the blend and to give good properties to the resulting shaped article. This is accomplished by reaction between functional groups of the compatibilizing polymer and functional groups of the polar ethylene copolymer. Such polymer blends can be formed into sheets, films, and other shaped articles which have many properties comparable to polyvinyl chloride (PVC), but with better elongation and with no chlorine.

The term "non-polar thermoplastic polyolefin" (component (1)) means any polyolefin polymer which is thermoplastic but which excludes polar ethylene copolymers as defined herein. The blends of the invention contain 50–98% of a polyolefin, preferably 60–90% by weight. In general, these polyolefins will have a melt flow index (MFI) in the range of 0.01–100 g/10 min., preferably less than 5 g/10 min. as determined by ASTM D-1238 (measured at 2.16 kg and 190° C. or 230° C. depending on the polyolefin used) and are well-known in the art. Useful and preferred polyolefins are high density polyethylene (HDPE) and polypropylene. Other polyolefin homopolymers and copolymers of ethylene can be utilized in the practice of this invention. Such other polyolefins include low density polyethylene (LDPE), very low density polyethylene (VLDPE), linear low density polyethylene (LLDPE) and polybutylene (PB). However, these other polyolefins can be blended with other polyolefins such as polypropylene ("PP") or high density polyethylene ("HDPE"). As used herein the term "polypropylene" includes homopolymers of propylene as well as copolymers of polypropylene which can contain about 1 to about 20 weight percent ethylene or an alpha olefin comonomer of 4 to 16 carbon atoms. The polypropylene can be highly crystalline isotactic or syndiotactic polypropylene. The copolymer can be either a random or block copolymer. The density of the PP or copolymer can be from about 0.88 to about 0.92 g/cc; generally, from about 0.89 to about 0.91 g/cc.

High density polyethylene useful as a polyolefin resin of this invention, has a density of about 0.941 to about 0.965 g/cc. High density polyethylene is an established product of commerce and its manufacture and general properties are well known to the art. Typically, HDPE has a relatively broad molecular weight distribution, characterized by the ratio of weight average molecular weight to number average molecular weight of from about 20 to about 40.

Low density polyethylene (LDPE) as used herein means both low and medium density polyethylene having densities of about 0.910 to about 0.940 g/cc. The terms include linear polyethylene as well as copolymers of ethylene which are thermoplastic resins, but non-polar.

Very low density polyethylene (VLDPE) is used herein to mean polyethylene having a density below about 0.910 g/cc and includes linear polyethylene as well as copolymers of ethylene which are thermoplastic resins, but non-polar.

Linear low density polyethylene (LLDPE) is a class of low density polyethylene characterized by little, if any, long chain branching, in contrast to conventional LDPE. The processes for producing LLDPE are well known in the art and commercial grades of this polyolefin are available. The term LLDPE means copolymers of ethylene and other alpha-olefins such as 1-butene, 1-hexene, and 1-octene. Useful LLDPEs have both high and low molecular weights. Such copolymers with 1-butene tend to be more crystalline and thus are more useful as roofing liners; whereas such copolymers with 1-octene are clearer and perhaps more useful in packaging applications. The LLDPEs are preferred.

Polybutylene includes both poly(1-butene) homopolymer and a copolymer with, for example, ethylene, propylene, pentene-1, etc. Commercially useful products are of high molecular weight and isotacticity. A variety of commercial grades of both homopolymer and ethylene-butene-1 copolymers are available with melt flow indices that range from about 0.3 to about 20 g/10 min.

Any of the aforesaid olefin polymers can also be blended with 10% to 70% by weight (preferably 10–40%) of an ethylene-propylene copolymer rubber (EP), or an ethylene/propylene/non conjugated diene copolymer rubber (EPDM), both of which are well-known in the art. The non conjugated dienes can contain from 6–22 carbon atoms having at least one readily polymerizable double bond. The ethylene/propylene copolymer rubber contains about 60–80 weight percent, usually about 65–75 weight percent ethylene. The amount of non conjugated diene, when used, is generally from about 1–7 weight percent, usually 2–5 weight percent. Preferably the ethylene/propylene copolymer rubbers are EPDM copolymers. EPDM copolymers that are especially preferred are ethylene/propylene/1.4-hexadiene, ethylene/propylene/dicylopentadiene, ethylene/propylene/norbornene, ethylene/propylene/methylene-2-norbornene, and ethylene/propylene/1.4-hexadiene/norbornadiene copolymers. These polymeric rubbers will generally have a Mooney viscosity as measured by ASTM D-1646 (1+4/121° C.) in the range of 20–50. Blends of polypropylene with EP rubbers are available commercially from Himont Inc. as elastomeric polyolefins and are sold under the name HIFAX (e.g. HIFAX FX 7023 XEP; HIFAX FX 7036 XCP).

Compatibilizing polymer (2) is an olefin polymer such as described above, which has been functionalized by copolymerizing or grafting a carboxylic acid or derivative thereof (such as an anhydride), an epoxy group such as provided by glycidylacrylate or methacrylate, an amino group or a hydroxyl group to the polymer by known processes.

For example, epoxy groups can be attached by reacting maleic anhydride functionalized resins with multifunctional, low molecular weight epoxy resins, such as EPON 1007 (available from Shell), or alternatively, by grafting glycidylmethacrylate onto polyolefins by a reactive extrusion process.

Amino and hydroxyl functionalities can be attached by reacting carboxylic acid functionalities or derivatives thereof with amines, according to known procedures.

The blends of the invention contain 1–25% by weight of the compatibilizing polymer (2), preferably 2–20%. Any of the above-described non-polar thermoplastic polyolefins (including the EP and EPDM rubbers) can be subjected to the functionalizing process. While up to 20% by weight of a polar monomer can be used, it is preferred to use non-polar monomers. A polyolefin is graft modified with 0.01 to 10.0 weight percent, preferably 0.05 to 2 weight percent, of a carboxylic acid or a derivative thereof. The grafting of the polyolefin can be carried out in the melt state, in solution or in suspension as described in the state-of-the-art literature. The melt viscosity of the modified polyolefin is not restricted, however, most effective compatibilization with modified polypropylene is found if the melt index, measured according to ASTM D-1238 (at 2.16 kg and 190° C.) is between 50 to 150 g/10 min. and with modified polyethylene if the melt index (measured at 2.16 kg and 190° C.) is less than 6 g/10 min., respectively.

Glycidylacrylate or methacrylate and maleic anhydride are the preferred functionalizing groups. If glycidylacrylate or methacrylate is used to functionalize the olefin polymer, then maleic anhydride, amino groups or hydroxyl groups are used to functionalize the polar ethylene copolymer. Such modified polyolefins can be prepared as described, for example, in published European Patent Application Nos. 370,735 and 370,736.

If a carboxylic acid or a derivative thereof is used to functionalize the compatibilizing polymer (2), then an epoxy group (such as provided by glycidylmethacrylate), an amino group or a hydroxyl group can be used to functionalize the polar ethylene copolymer (3).

If an amino group or a hydroxyl group is used to functionalize the compatibilizing polymer (2), then an epoxy group (such as provided by glycidylmethacrylate) or a carboxylic acid group or a derivative thereof can be used to functionalize the polar ethylene copolymer (3).

Polar ethylene copolymers (3) useful in the blends of this invention and their preparation are described in U.S. Pat. No. 3,780,140 to Hammer, U.S. Pat. No. 3,264,272 to Rees and U.S. Pat. No. 4,351,931 to Armitage, the descriptions of which are incorporated by reference. The blends of the invention contain 1–49% by weight polar ethylene copolymers, preferably 5–40% by weight, more preferably 5–20%.

These polar ethylene copolymers preferably consist essentially of ethylene and one or more comonomers which are chlorine-free and are copolymerizable ethylenically unsaturated organic compounds. Such comonomers are selected from the class consisting of non-chlorine containing unsaturated mono- and dicarboxylic acids of 3–20 carbon atoms such as acrylic and methacrylic acid, esters of such unsaturated mono- or dicarboxylic acids, vinyl esters of saturated carboxylic acids wherein the acid group has 1–18 carbon atoms, vinyl alkyl ethers wherein the alkyl group has 1–18 carbon atoms, acrylonitrile, methacrylonitrile, copolymerizable unsaturated hydrocarbons such as alpha-olefins of 3–12 carbon atoms, ring compounds such as norbornene and vinyl aromatic compounds.

More preferably, the polar ethylene copolymers consist essentially of ethylene, one or more comonomers as indicated in the previous paragraph and carbon monoxide.

In particular, these copolymers consist essentially of, by weight, (a) 30–90% ethylene (preferably 30–80%), (b) 0–60% (preferably 5–60%) of one or more copolymerizable comonomers and (c) 0–30% carbon monoxide (preferably 3–30%). Especially preferred copolymers include those consisting essentially of 56–76% ethylene, 10–34% of said copolymerizable comonomer(s) and 0–15% carbon monoxide (more preferably 3–15%).

Other preferred polar ethylene copolymers (3) consists essentially of (a) 60–90% by weight of ethylene; and (b) 10–40% by weight of a mono- or dicarboxylic acid of 3–20 carbon atoms.

More preferred copolymers include those in which vinyl acetate or an alkyl (1–8 carbons) acrylate or alkyl methacrylate (particularly n butyl acrylate) is the comonomer. The copolymers normally have a melt flow index within the range 0.1–1000 g/10 min., preferably 1–500, measured according to ASTM D-1238. Most preferably, the melt index is less than 100 g/10 min.

The polar ethylene copolymers as described above are grafted with 0.01–10% (preferably 0.05–2%) by weight of reactive groups selected from glycidyl acrylate or methacrylate, of an alpha, beta-unsaturated carboxylic acid or a derivate thereof, or an amino or hydroxyl group.

In the case where acrylic or methacrylic acid is used as comonomer (3)(b) of the polar ethylene copolymer (3), there is no need to graft the polar ethylene copolymer (3) with another functional group.

If a glycidyl acrylate or methacrylate is used to functionalize the olefin polymer compatibilizing polymer (2), then the polar ethylene copolymer (3) is functionalized with a carboxylic acid or a derivative thereof. The reverse also applies. Alternative functionalities of the polar ethylene copolymer (3) can be amino or hydroxyl groups. The epoxy and acid groups are reactable under melt-processing or blending conditions so as to obtain a compatible polymer composition. The epoxy and amino, as well as the epoxy and hydroxyl groups, are reactable as well. If the non-polar olefin of the compatibilizing polymer (2) is functionalized with an amino or hydroxyl group, the polar ethylene copolymer (3) must be functionalized with a carboxylic acid or derivative thereof, or with an epoxy group. Again, the epoxy group is reactable with amino or hydroxyl groups, and the carboxylic acid or derivative thereof is reactable with the amino or hydroxyl group.

The preferred grafting monomer for the polar ethylene copolymer is at least one of alpha, beta-ethylenically unsaturated carboxylic acids and anhydrides, including derivatives of such acids and anhydrides, and including mixtures thereof. Examples of the acids and anhydrides, which may be mono-, di- or polycarboxylic acids, are acrylic acid, methacrylic acid, maleic acid, fumaric acid, itaconic acid, crotonic acid, itaconic anhydride, maleic anhydride and substituted maleic anhydride e.g. dimethyl maleic anhydride. Examples of derivatives of the unsaturated acids are salts, amides, imides and esters e.g. mono- and disodium maleate, acrylamide, maleimide and diethyl fumarate. Maleic anhydride is preferred. Grafting can be carried out using conditions similar for the grafting of polyolefins described above.

The blends of the invention can be prepared by mixing the polymeric ingredients and optional additives by use of conventional masticating equipment, for example, a rubber mill, Brabender Mixer, Banbury Mixer, Buss-ko kneader, Farrel continuous mixer, or twin screw continuous mixer. Mixing times should be sufficient to obtain homogeneous blends. Satisfactory mixing times depend upon the types of polymers and upon the type and amount of compatibilizer. Typically, mixing times of about 5 minutes at 190°–200° C. are satisfactory. If the polymer blend is obviously non-homogeneous, additional mixing is required.

In addition to its polymer components, the composition of this invention can include reinforcing and non-reinforcing fillers, antioxidants, stabilizers, lubricants (e.g., oleamide), antiblocking agents, antistatic agents, waxes, coupling agents for fillers, pigments, fire retardants, titanium dioxide, talc and other processing aids known in the polymer compounding art. These pigments and other additives comprise 0 to about 50 weight percent of the total composition preferably 5 to 30 weight percent of a filler.

The invention can be further understood by the following examples in which parts and percentages are by weight and temperatures are in degrees Celsius.

DESCRIPTION OF THE PREFERRED EMBODIMENTS

Examples 1–3

Polymeric blends are prepared by melt compounding 80% of an ethylene-propylene rubber copolymer modified polypropylene (PP-EP rubber; 20% EP rubber), 5–20% of an ethylene terpolymer (57% ethylene, 30% n-butylacrylate, and 13% carbonmonoxide) having a MFI (190°/2.16 kg)=4 grafted with 0.2–0.3% maleic anhydride (MAH), and 5–15% of an ethylene-propylene-diene terpolymer grafted with 0.86% glycidyl methacrylate (EPDM-g-GMA) having a MFI (280°/2.16 kg)=1.2. The EP-modified polypropylene has a MFI (230°/2.16 kg) of 0.8 g/10 minutes (ASTM D1238) and is sold by Himont Inc. as HIFAX FX 7036 XCP.

Melt compounding of each blend is carried out in a Brabender internal mixer with batches from 45–50 grams at 190° at a speed of 80 rpm for ca. 5 minutes. The melt then is removed and sheeted out on a laboratory two roll mil at 170°. The milled sheet then is formed into a testing plaque in a hydraulic press at 180° for 5 minutes. Afterwards, stress-strain testing (ASTM D-638) is carried out. Results are shown in Table 1, wherein TS is tensile strength; EB is elongation at break; and EY is elongation at yield.

TABLE 1

| Example Number | 1 | 2 | 3 | Control 1 | Control 2 |
| --- | --- | --- | --- | --- | --- |
| (1) PP-EP rubber | 80 | 80 | 80 | 80 | 100 |
| (2) EPDM-g-GMA | 5 | 10 | 15 | — | — |
| (3) EnBACO-g-MAH | 15 | 10 | 5 | 20 | — |
| Properties |  |  |  |  |  |
| TS (MPa) | 15.9 | 16.7 | 15.9 | 16 | 22 |
| EB (%) | 780 | 800 | 780 | 720 | 810 |
| EY (%) | 16 | 23 | 27 | 21 | 14 |

Addition of a glycidyl methacrylate grafted ethylene-propylene-diene terpolymer to a blend of a maleic anhydride grafted polar, elastomeric ethylene copolymer and a non-polar, thermoplastic polyolefin has greater flexibility than the pure elastomer-thermoplastic blend as shown by the better elongation properties.

Examples 4–6

The second set of experiments are carried out by melt compounding 65–70% of a PP-Homopolymer (SHELL HM 6100, available from Shell, MFI=3 at 230° C.), 30% of a copolymer of ethylene with ethylene methacrylic acid, neutralized with zinc ions (SURLYN 9220, available from DuPont, MFI=1 at 190° C./2.16 kg), and 5% of a copolymer of ethylene-propylene-diene grafted with 0.7% 1,3-pentanediamine (component (2a) in Table 2, below, MFI=9 at 190° C./2.16 g) or 0.7% N-(2-(aminoethyl)-ethanolamine (component (2b) in Table 2, below, MFI=5 at 190° C./2.16 kg).

Melt compounding is carried out in a Brabender Plasticorder single screw extruder (25 mm 20 L/D) at a melt temperature of 240°–250° C. and a 1 mm rail sheet is extruded on a take of unit equipped with a fabric-belt.

The results are shown in Table 2, where the abbreviations have the meanings previously used, and IS is impact strength.

TABLE 2

| Example Number | 4 | 5 | 6 |
| --- | --- | --- | --- |
| (1) PP-Homopolymer | 70 | 65 | 65 |
| (2a) EPDM-g-NH |  | 5 |  |
| (2b) EPDM-g-NH |  |  | 5 |
| (3) SURLYN 9220 | 30 | 30 | 30 |

TABLE 2-continued

| Example Number | 4 | 5 | 6 |
|---|---|---|---|
| Properties | | | |
| TS (MPa) | 26 | 18 | 17 |
| EB (%) | 20 | 148 | 111 |
| IS (J/m) | <261 | 4013 | 3495 |

Tensile properties are measured in the machine direction on cut out dumbbells according to ASTM D638; Impact strength is determined according to the falling weight method, following ASTM D4226 (ISO 6603/1).

What is claimed is:

1. A flexible, nonhalogen-containing polymer composition which comprises a blend of:

(1) 50–98% by weight of a non-polar thermoplastic polyolefin, (2) 1–25% by weight of a compatibilizing polymer which is an olefin polymer containing less than 20% by weight of a copolymerized polar monomer and containing 0.01–10% by weight of reactive groups selected from the group consisting of an epoxy, a carboxylic acid or anhydride, an amino and a hydroxyl; and (3) 1–49% by weight of a polar copolymer consisting essentially of:

(a) 30–90% by weight of ethylene;

(b) 0–60% by weight of at least one copolymerizable, ethylenically unsaturated organic compound; and (c) 0–30% by weight of carbon monoxide; wherein the total of (a), (b), and (c) is 100%;

said polar copolymer (3) containing 0.01–20% by weight of functionalizing groups selected from the group consisting of an epoxy, a carboxylic acid or a derivative thereof, an amino and a hydoxyl; whereby if an epoxy group is used to functionalize the compatibilizing polymer (2), then the polar ethylene copolymer (3) is functionalized with a carboxylic acid or derivative thereof or with an amino or hydroxyl group;

if a carboxylic acid or derivative thereof is used to functionalize the compatibilizing coplymer (2), then the polar ethylene copolymer (3) is functionalized with an epoxy, an amino or a hydroxyl group; and if an amino or hydroxyl group is used to functionalize the compatibilizing polymer (2), then the polar ethylene copolymer (3) is functionalized with an epoxy group or with a carboxylic acid or derivative thereof.

2. A flexible polymer composition of claim 1 wherein the functional groups of the compatibilizing polymer (2) and the functional groups of the polar ethylene copolymer (3) have reacted.

3. A flexible polymer composition of claim 1 wherein the non-polar thermoplastic polyolefin (1) is polypropylene, high density polyethylene, a linear low density polyethylene, or a blend of one of the above with an ethylene-propylene rubber or an ethylene-propylene-diene rubber.

4. A flexible polymer composition of claim 3 wherein the compatibilizing polymer (2) is polypropylene, high density polyethylene, a linear low density polyethylene, an ethylene-propylene rubber, an ethylene-propylene-diene rubber, or a blend of any of the above, said compatibilizing polymer (2) grafted with 0.05–2% by weight of glycidyl acrylate or methacrylate; and the polar ethylene copolymer (3) consists essentially of:

(a) 30–80% by weight ethylene;

(b) 5–60% by weight of vinyl acetate or an alkyl acrylate or alkyl methacrylate, wherein the alkyl group is from 1–8 carbon atoms; and (c) 3–30% by weight of carbon monoxide, said polar ethylene copolymer grafted with 0.05–2% by weight of a carboxylic acid or a derivative thereof.

5. A flexible polymer composition of claim 3 wherein the compatibilizing polymer (2) is polypropylene, high density polyethylene, a linear low density polyethylene, an ethylene-propylene rubber, an ethylene-propylene-diene rubber, or a blend of any of the above, said compatibilizing polymer (2) grafted with 0.05–2% by weight of an amine; and the polar ethylene copolymer (3) consists essentially of:

(a) 60–90% by weight ethylene;

(b) 10–40% by weight of a mono or dicarboxylic acid of 3–20 carbon atoms.

6. A flexible composition of claim 4 or 5 wherein the blend comprises 60–90% by weight of non-polar thermoplastic polyolefin (1), 2–20% by weight of compatibilizing polymer (2), and 5–40% by weight of polar ethylene copolymer (3).

7. A flexible polymer composition of claim 1 wherein the compatibilizing polymer (2) is polypropylene, high density polyethylene, a linear low density polyethylene, an ethylene-propylene rubber, an ethylene-propylene-diene rubber, or a blend of any of the above, said compatibilizing polymer (2) grafted with 0.05–2% by weight of glycidyl acrylate or methacrylate.

8. A flexible polymer composition of claim 1 wherein the polar ethylene copolymer (3) consists essentially of:

(a) 30–80% by weight ethylene;

(b) 5–60% by weight of vinyl acetate or an alkyl acrylate or alkyl methacrylate, wherein the alkyl group is from 1–8 carbon atoms; and (c) 3–30% by weight of carbon monoxide, said polar ethylene copolymer grafted with 0.05–2% by weight of a carboxylic acid or a derivative thereof.

9. A flexible polymer composition of claim 1 wherein the polar ethylene copolymer (3) consists essentially of:

(a) 60–90% by weight of ethylene; and (b) 10–40% by weight of a mono- or dicarboxylic acid of 3–20 carbon atoms.

10. A flexible polymer composition of claim 1 wherein the blend comprises 60–90% by weight of non-polar thermoplastic polyolefin, 2–20% by weight of compatibilizing polymer, and 5–40% by weight of polar ethylene copolymer.

11. A flexible polymer composition of claim 1 wherein additives are contained in the composition up to 50% by weight of the total composition.

12. A flexible composition of claim 1 in the form of a shaped article.

* * * * *